United States Patent [19]
Miyatake et al.

[11] Patent Number: 6,018,505
[45] Date of Patent: *Jan. 25, 2000

[54] MAGNETO-OPTICAL DISC APPARATUS

[75] Inventors: Norio Miyatake, Hyogo; Masahiro Birukawa, Osaka; Kiyoshi Uchida, Nara, all of Japan

[73] Assignee: Matsushita Electrical Industrial Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/785,502

[22] Filed: Jan. 17, 1997

[30] Foreign Application Priority Data

Jan. 19, 1996 [JP] Japan .................................. 8-006962

[51] Int. Cl.[7] .................................................. G11B 11/00
[52] U.S. Cl. .............................. 369/13; 360/59; 360/114
[58] Field of Search ................................ 369/13–14, 288, 369/116, 110, 275.1, 275.2, 284, 100; 360/59, 114, 103, 73.08, 73.02

[56] References Cited

U.S. PATENT DOCUMENTS

| | | | |
|---|---|---|---|
| 5,025,430 | 6/1991 | Takokoro et al. | 369/13 |
| 5,051,970 | 9/1991 | Ishii et al. | 369/13 |
| 5,187,694 | 2/1993 | Ichihara et al. | 369/13 |
| 5,202,863 | 4/1993 | Miyatake et al. | 369/13 |
| 5,461,595 | 10/1995 | Machida | 369/13 |
| 5,517,472 | 5/1996 | Miyatake et al. | 369/13 |
| 5,592,445 | 1/1997 | Onagi | 369/13 |

FOREIGN PATENT DOCUMENTS 05266523A 10/1993 Japan .

OTHER PUBLICATIONS

Kaneko, M. et al., "Multilayered Magneto–Optical Disks for Magnetically Induced Superresolution," JJAP Series 6, Proc. Int. Symp. on Optical Memory, 1991, pp. 203–210.

Iida, H. et al., "Recording Power Characteristics of 130 mm Overwritable MO Disk by Laser Power Modulation Method," Proc. Int. Symp. on Optical Memory, 1989, *Japanese Journal of Applied Physics*, 28 (1989) Supplement 28–3, pp. 367–370.

*Primary Examiner*—Ali Neyzari
*Attorney, Agent, or Firm*—Morrison & Foerster LLP

[57] ABSTRACT

In a magneto-optical disc apparatus using an initializing magnetic field generator, the magnetic field generator including a permanent magnet slides on or and floats above a surface of the magneto-optical disc for applying a magnetic field at a position on a track and precede to or follow a light beam spot irradiated by an optical head.

14 Claims, 14 Drawing Sheets

MAGNETO-OPTICAL DISC APPARATUS

BACKGROUND OF THE INVENTION

This invention relates to a magneto-optical disc apparatus for recording and reproducing data on a magneto-optical disc, and especially a magneto-optical disc having a magneto-optical recording medium with two or more different coercive force regions at room temperature.

DESCRIPTION OF THE PRIOR ART

A first art recognized technique includes a conventional magneto-optical disc apparatus using a magneto-optical disc satisfying the requirements of the ISO standard (hereinafter abbreviated as ISO magneto-optical disc), for recording a new data on a magneto-optical recording medium of the magneto-optical disc, in which old data previously recorded on tracks on the magneto-optical recording medium is erased. The new data is then recorded on the tracks. Thus, a predetermined inherent time is needed for recording data on the magneto-optical recording medium.

In order to shorten the time for recording the data on the magneto-optical recording medium, a light intensity modulation overwriting technique is proposed. The light intensity modulation overwriting technique uses a magneto-optical recording medium having multi-layer configuration capable for directly overwriting the data on the recording medium. The recording medium includes a recording-reproducing layer having a first vertical magnetic anisotropy and a supplemental recording layer having a second vertical magnetic anisotropy which is different from the first vertical magnetic anisotropy of the recording-reproducing layer, (see: "Recording Power Characteristics of 130 mm Overwritable MO Disc by Laser Power Modulation Method" Japanese Journal of Applied Physics, Vol. 28 (1989) Supplement 28-3 pp. 367–370).

The principle of the light intensity modulation overwriting technique is described with reference to FIG. 13. As can be seen from FIG. 13, a recording medium such as a magneto-optical disc 40 includes at least a referential layer 41 and a recording layer 42. The coercive force of the referential layer 41 is smaller than that of the recording layer 42 at the room temperature. The Curie temperature of the referential layer 41 is smaller than that of the recording layer 42 at the room temperature. The Curie temperature of the referential layer 41 is higher than that of the recording layer 42. In case of overwriting the data on the recording medium 40, an initializing magnetic field generator 43 is used for arranging the magnetization in each region of the referential layer 41 in the same direction. When the recording medium 40 moves or rotates in a direction shown by arrow 50 in the figure, the magnetization of the referential layer 41 is arranged in, for example, the downward direction by the magnetic field of the initializing magnetic field generator 43. However, the magnetization in each region of the recording layer 42 does not change, since the coercive force of the recording layer 42 is selected to be much higher than the intensity of the magnetic field due to the initializing magnetic field generator 43.

A laser light beam 46 is focused on a surface of the recording medium 40 by an objective lens 45. The intensity of the laser light beam 46 can be provided at three levels, a lower powered level, a normal powered level and a higher powered level. When the data is overwritten on the recording medium 40, the laser light beams 46 is adjusted at the normal powered level and at the higher powered level. When the intensity of the laser light 46 is adjusted at the normal powered level, a temperature in a first portion 41a of the referential layer 41 and a temperature in a second portion 42a of the recording layer 42 respectively positioned below a region 49 is irradiated (hereinafter abbreviated as the laser irradiated region 49) respectively become higher than the Curie temperature of the recording layer 42, but lower than the Curie temperature of the referential layer 41. Accordingly, the magnetization in the second portion 42a of the recording layer 42 positioned just below the laser irradiated region 49 will be erased. On the other hand, the magnetization in the first portion 41a of the referential layer 41 below the laser irradiated region 49 via the second portion 42a is not erased. At this time, a magnetic field due to a biasing magnetic field generator 44 exists in the first and second portions 41a and 42a positioned below the laser irradiated region 49. However, the intensity of the magnetic field due to the biasing magnetic field generator 44 is too weak to change the magnetization in the first portion 41a of the referential layer 41. When the second portion 42a of the recording layer 42 where the magnetization was erased has receded from the laser irradiated region 49, the temperature in the second portion 42a of the recording layer 42 becomes lower. Thus, the magnetization will appear in the second portion 42a of the recording layer 42 again. At this time, the magnetic exchange interacts between the referential layer 41 and the recording layer 42, so that the magnetization in the second portion 42a of the recording layer 42 arranges in the same direction (downward in the figure) as the magnetization in the first portion 41a of the referential layer 41.

When the intensity of the laser light 46 is adjusted at the higher powered level, the temperature in the first region 41a of the referential layer 41 and the temperature in the second region 42a which are positioned below the laser irradiated region 49 respectively become higher than both the Curie temperature of the recording layer 42 and the Curie temperature of the referential layer 41. Accordingly, both the magnetization in the second portion 42a of the recording layer 42 and the magnetization in the first portion 41a of the referential layer 41 are erased. When the first portion 41a of the referential layer 41 and the second portion 42a of the recording layer 42 have receded from the laser irradiated region 49, the temperatures of the first and second portions 41a and 42a will decrease. The magnetization appears in the first portion 41a of the referential layer 41 faster than in the second portion 42a of the recording layer 42. At this time, the first portion 41a of the referential layer 41 is effected by the magnetic field due to the biasing magnetic field generator 44, so that the magnetization in the first portion 41a turns reversely in upward direction in the figure. When the temperature of the first and second portions 41a and 42a further decrease, the magnetization in the second portion 42a of the recording layer 42 appears again. The magnetization in the second portion 42a of the recording layer 42 arranges in the same direction (upward direction in the figure) as the magnetization in the first portion 41a of the reference layer 41 due to the magnetic exchange interaction.

By changing the intensity of the laser light beam 46 between the normal powered level and the higher powered level corresponding to digital information of "0" and "1" which are to be recorded, new data 48 can be directly overwritten on the recording medium 40 free from the old data 47. On the other hand, when the laser light beam is 46 is irradiated at the lower powered level for reproducing the data recorded on the recording medium 40, the temperature in the second portion 42a of the recording layer 42 positioned below the laser irradiated region 49 is lower than the Curie temperature of the recording layer 42, so that the magnetization in the second portion 42a of the recording layer 42 does not change. Accordingly, the data recorded on the recording layer 42 can be reproduced by detecting the direction of the magnetization in the second portion 42a of the recording layer 42 by using the lower powered level laser light beam 46.

A second art recognized technique includes a multi-layer magneto-optical recording medium having two or more layers respectively having different coercive forces for increasing the recording density (more specifically, reproducing density). The data is read out from a region narrower than the diameter on the laser light spot. (see: NIKKEI ELECTRONICS, 1991.10.28 No. 539, pp 223–233). This technique is called "Magnetically induced Super Resolution" (hereinafter abbreviated as MSR technique), since the super resolution effect can be obtain by utilizing the magnetic characteristics of magnetic layers different from each other due to the temperature. The MSR technique includes the Front Aperture Detection method (hereinafter abbreviated as FAD), the Rear Aperture Detection method (hereinafter abbreviated as D RAD). The FAD uses a recording medium having a recording layer, a insulating layer and a reproducing layer, and the data is read out from a lower temperature portion on the recording medium. The RAD uses a recording medium having a recording layer and a reproducing layer, and the data is read out from a higher temperature portion on the recording medium. The D-RAD uses a recording medium having a recording layer, a middle layer, a supplemental reproducing layer and a reproducing layer. The data is read out from a portion at a predetermined temperature on the recording medium.

In the above-mentioned MSR techniques, the RAD and the D-RAD need a magnetic field generator for initializing the recording medium. In the RAD, the magnetic field generator is used for arranging the magnetization in the reproducing layer in the same direction. In the D-RAD, the magnetic field generator is used for arranging the magnetization of the supplemental reproducing layer and the reproducing layer in the same direction. Furthermore, both of the RAD and D-RAD need two magnetic field generators, and initializing magnetic field generator and a reproducing magnetic field generator. The initializing magnetic field generator generates a large intensity of the magnetic field for initializing the recording medium. The reproducing magnetic field generator generates a magnetic field in the opposite direction to and smaller than the magnetic field generated by the initializing magnetic field generator. The D-RAD is an improvement of the RAD, and is described with reference to FIGS. 14(a) and 14(b). FIG. 14(a) is a plan view showing a relation on a track or a recording medium seen from laser irradiation side. FIG. 14(b) is a cross-sectional side view of the recording medium.

As can be seen from FIG. 14(b), the magneto-optical disc 60 includes a reproducing layer 63, a supplemental reproducing layer 64, a middle layer 65, a recording layer 66, a substrate (not shown in the figure) and so on. Arrow 60 designates a moving direction along a track on the magneto-optical disc 60. Arrow 61 designates a direction of external magnet field applied for recording and reproducing the data. Arrow 62 designates a magnetic field for initialing the magneto-optical disc 60. As shown in FIG. 14(a), when the data on the magneto-optical disc 60 is reproduced, a laser light spot 67 is focused along the track on the magneto-optical disc 60.

When the laser light spot 67 is focused on the rotating magneto-optical disc 60, the temperature distribution of each magnetic layer, including the reproducing layer 63 and the supplemental reproducing layer 64, becomes rotationally asymmetric such as an oval shape as shown in FIG. 14(a) in the rear side of the laser light spot 67. The temperature distribution can be considered to be divided into two regions of a high temperature region 69 and a middle temperature region 70. The high temperature region 68 is defined as a region where the temperature is higher than the Curie temperature Tc of the supplemental reproducing region 64.

Signals (data) are assumed to be previously thermomagnetically recorded as recording magnetic domains 68 on the recording layer 66. The middle layer 65 is provided for stabilizing the magnetic walls when the magnetization of the reproducing layer 68 coincides with that of the recording layer 66.

The reproducing operation of the magneto-optical disc 60 is as follows. First, the magnetization in the reproducing layer 63 is arranged in the same direction (for example, downward in the figure) by an initializing magnetic field 62. When the laser light is irradiated on the magneto-optical disc 60 for reproducing the data, the temperature distribution such as the high temperature region 69 and the middle temperature region 70 occurs in each magnetic layer. In the reproducing layer 63, the coercive force is reduced due to the increase of the temperature, so that the magnetic exchange interaction between the reproducing layer 63 and the recording layer 66 governs in the middle temperature region 70. Thus, the magnetization in the reproducing layer 83 is arranged in the same direction as the magnetization in the recording layer 66. On the other hand, the temperature in the high temperature region 69 in the supplemental reproducing layer 64 becomes higher than the Curie temperature of the supplemental reproducing layer 64, so that the magnetization in the supplemental reproducing layer 64 disappears. When the magnetization disappears, the magnetic exchange interaction between the reproducing layer 63 and the recording layer 66 corresponding to the high temperature region 69 will be intercepted. Thus, the magnetization in the reproducing layer 63 is governed by the reproducing magnetic field 61 and the magnetization in the reproducing layer 63 is arranged in the same direction (for example, upward in the figure).

With respect to the direction of the magnetization in the reproducing layer 63 under the laser light spot 67, there are three regions. The magnetization in a first region is arranged in downward in the figure at all times by the effect of the initializing magnetic field. The magnetization in a second high temperature region is arranged in upward in the figure at all times by the biasing magnetic field. The magnetization in a third middle temperature region is arranged in the same direction as the magnetization in the recording magnetic domain 68. In the first and second regions, the magnetization is arranged in the constant direction at all times, so that data or information cannot be obtained from the first and second regions. The data or information in the recording layer 66 can be obtained only from a region where the laser light spot 67 and the middle temperature region 70 are overlapped. The other region where the laser light spot 67 is irradiated can be regarded as substantially masked. In other word, even when the recording magnetic domain 68 is much smaller than the laser light spot 67, the data recorded in the recording magnetic domain 68 can be reproduced. Thus, a high density reproducing can be achieved.

The above-mentioned techniques relate to the recording and reproducing media. On the other hand, with respect to the single use of reproducing media, a method for increasing the recording density by using a super resolution method is discussed in, for example, Publication Gazette of Unexamined Japanese Patent Application Hei 5-266523. The third art recognized technique includes a first dielectric layer, a recording layer made of magnetic material, a second dielectric layer and a reflection layer serially laminated on a transparent substrate. Marks which are gathering of minute convex and concave are formed on the surface of the transparent substrate. Data or information is defined by the marks, and the marks are transferred to a surface shape of the first dielectric layer. Furthermore, the surface shape of the first dielectric layer is reflected to the change of coercive force of the recording layer which is disposed above the first dielectric layer. More specifically, the coercive force Hm in marked portions in the recording layer disposed above the marks is selected to be relatively larger, and the coercive force Hn in the other non-marked portions are selected to be relatively smaller. In other word, the third technique relates to the super resolution reproducing method using the recording media in which the coercive force in marked portions is different from the other portions.

In a first reproducing method, an initializing magnetic field H1 which is larger than the coercive force Hm in the marked portions and the coercive force Hn in the non-marked portions and has a predetermined constant direction is applied to the recording medium. Thus, the marked portions and the non-marked portions are magnetized in the same direction. After applying the initializing magnetic field H1, a reversing magnetic field H2, which has an intensity between Hm and Hn and has a direction opposite to the initializing magnetic field H1, is applied for reversing the magnetization direction in the non-marked portions. Thus, the magnetization in the marked portions is reversed to that in the non-marked portions. Under this condition, when a light beam, which is relatively intensive so as to erase the magnetization in the marked portions and the non-marked portions in the rear of the light beam spot, is irradiated on the recording medium, a signal can be detected from the portion in ahead of the light beam spot. Thus, a signal from the marked portion which is narrower than the light beam spot can be obtained. In this method, an initializing magnetic field generator and the reversing magnetic field generator are necessarily disposed in ahead of the light beam spot.

In a second reproducing method, the initializing magnetic field generator (intensity of output magnetic field H1) is disposed in ahead of the light beam spot, and both of the marked portions are magnetized in a predetermined direction. After that, a relatively weak biasing magnetic field H3 is applied while the reproducing light beam is of the magnetic field H3) is provided in the vicinity of the region where the reproducing light beam is irradiated. At this time, power of laser light beam is controlled to heat the recording layer at a temperature lower than the Curie temperature of the recording layer in a manner so that only the magnetization in the non-marked portions in which the coercive force is relatively small turns reversely by the biasing magnetic field H3, but the magnetization in the marked portions in which the coercive force is relatively large is not turned. By such operations, the magnetization in the non-marked portions where the temperature reaches a predetermined value turns in a region where the reproducing laser light beam is irradiated, and the change of the magnetization can be detected as a signal. As a result, high density reproduction can be achieved.

The above-mentioned first technique needs an initializing magnetic field generator for generating an intense magnetic field of such as 2–5 kilooersted on the recording medium and a recording magnetic field generator for generating the magnetic field of several hundreds oersted.

The above-mentioned second technique needs an initializing magnetic field generator for an intense magnetic field of such as 2–5 kilooersted on the recording medium and a reproducing magnetic field generator for generating the magnetic field of several hundreds oersted.

The first reproducing method in the third technique needs an initializing magnetic field generator for generating an intense magnetic field of such as 2–5 kilooersted on the recording medium and a reversing magnetic field generator for generating the magnetic field generator for generating the magnetic field H2 of several hundreds oersted, which has an intensity between Hm and Hn and has a direction opposite to the initializing magnetic field H1, is applied for reversing the magnetization direction in the non-marked portions. The second reproducing method in the third technique needs an initializing magnetic field generator for generating an intense magnetic field of such as 2–5 kilooersted on the recording medium and a biasing magnetic field generator for generating the biasing magnetic field of several hundreds oersted for reversing the magnetization in the non-marked region.

Namely, each of the above-mentioned techniques involves a first (initializing) magnetic field generator for generating 2–5 kilooersted and a second magnetic generator for generating the magnetic field of several hundreds oersted. It, however, is very difficult to dispose a second magnetic field generator under the condition that a magnetic field having an intensity sufficient to prevent the contact of the initializing magnetic field generator and the recording medium is applied to the recording medium. Actually, in a conventional apparatus using the ISO 3.5 inch type cartridge of the disc, the opening of the cartridge is too narrow to provide two magnetic field generators. If a magnetic field generators are forcibly provided in the opening, the intensity of the magnetic field generated by the initializing magnetic field generator is larger, so that the magnetic field leaks into an objective lens actuator, and the objective lens moves abnormally. Furthermore, the magnetic field generated by the second magnetic field generator is affected by the magnetic field generated by the initializing magnetic field generator, so that the intensity of the magnetic field generated by the second magnetic field generator cannot be controlled to the desired value.

SUMMARY OF THE INVENTION

An objective of this invention is to provide an improved magneto-optical disc apparatus in which the initializing magnetic field generator and the biasing magnetic field generator, if necessary, can be disposed in a narrow space without affecting the objective lens actuator.

A first magneto-optical disc apparatus according to this invention uses a magneto-optical disc including a magneto-optical recording medium having at least two kinds of coercive forces at room temperature. A second magneto-optical disc apparatus uses a magneto-optical disc including a magneto-optical recording medium configured by at least two magnetic layers respectively having magnetic exchange interaction.

In both of the first and second magneto-optical apparatus of this invention, an optical head is moved in the radial direction of the magneto-optical disc and irradiates a light beam spot on a track on the magneto-optical disc. A magnetic field generator includes at least a permanent magnet and slides on or floats above a surface of the magneto-optical disc for applying a magnetic field at a position on the track which is in ahead of or behind the light beam spot.

The magnetic field generator slides on or floats above the surface of magneto-optical disc, so that the distance between the magnetic field generator and the surface of the magneto-optical disc can be made very short. Thus, when a compact permanent magnet is used as the magnetic field generator, the magnetic field having a sufficient intensity can be obtained. Furthermore, an area of the permanent magnet facing the surface of the magneto-optical disc can be made a square of about two or less millimeters. Therefore, the initializing magnetic field generator can be provided in a compact magneto-optical disc apparatus using the ISO 3.5 inch type magneto-optical.

Furthermore, the magnetic field generator moves in ahead of or behind the light beam spot on the track of the magneto-optical disc, so that the diameter of the magnetic flux for initializing the disc can be made very small. Thus, the initializing magnetic field generator of this invention can readily be designed rather than the conventional initializing magnetic field generator. As a result, the magneto-optical disc apparatus of this invention can be downsized. Furthermore, size of the magnetic field generator of this invention can be made smaller, so that the area where the magnetic field leaks can be much smaller than that of conventional apparatuses. As a result, any affect on the objective lens actuator of the optical head due to the leakage of the magnetic field can be reduced.

In the above-mentioned first magneto-optical disc apparatus, it is preferable that the intensity of the magnetic field generated by the magnetic field generator is larger than at least one coercive force (for example, Hc1) of the magneto-optical recording medium and smaller than at least one of the remained coercive forces (for example, Hc2) of the magneto-optical recording medium. Alternatively, it is preferable that the magnetic field generator has a plurality of magnetic field generating portions on a surface facing the magneto-optical disc, an intensity of a magnetic field generated by one of the magnetic field generating portion is larger than at least one coercive force (for example, Hc1) of the magneto-optical recording medium, and an intensity of a magnetic field generated by one of other magnetic field generating portions is smaller than at least one of remained coercive forces (for example, Hc2) of the magneto-optical recording medium. By such configurations, portions of the magneto-optical recording medium having the coercive force of Hc1 can be initialized to arrange the magnetization in the same direction without changing the magnetization in portions having the coercive force of Hc2.

In the above-mentioned second magneto-optical disc apparatus, it is preferable that the magnetic field generator has a plurality of magnetic field generating portions on a surface facing the magneto-optical disc with at least one of the magnetic field generating portions being disposed so as to apply a magnetic field to a position in ahead of or behind the light beam spot on the magneto-optical disc. By such a configuration, the initialization of the magneto-optical recording medium, recording and reproducing of the data on the recording medium can be operated by one magnetic field generator.

Furthermore, in the above-mentioned second magneto-optical disc apparatus, it is preferable that the magnetic field generator comprises a first magnetic field generating portion including a permanent magnet and a second magnetic field generating portion including a coiled electromagnet, the first magnetic field generating portion is disposed in a manner so as to apply a magnetic field at a position precede to or follow to the light beam spot on the magneto-optical disc, and the second magnetic field generating portion is disposed at a position in a manner so as to apply a magnetic field at the position of the light beam spot. By such a configuration, when the polarity of the magnetic field generated by the electromagnet is changed alternatively, the electromagnet can be used not only for recording the data on the magneto-optical recording medium but also for reproducing the data recorded on the magneto-optical recording medium. Furthermore, the electromagnet is provided on the sliding or floating magnetic field generator which slides on or floats above the magneto-optical disc, so that the apparatus of this invention can be downsized and electric power consumption can be reduced in comparison with the conventional apparatus using a fixed electromagnet.

DESCRIPTION OF THE PREFERRED EMBODIMENTS

First Embodiment

Figure 1A:
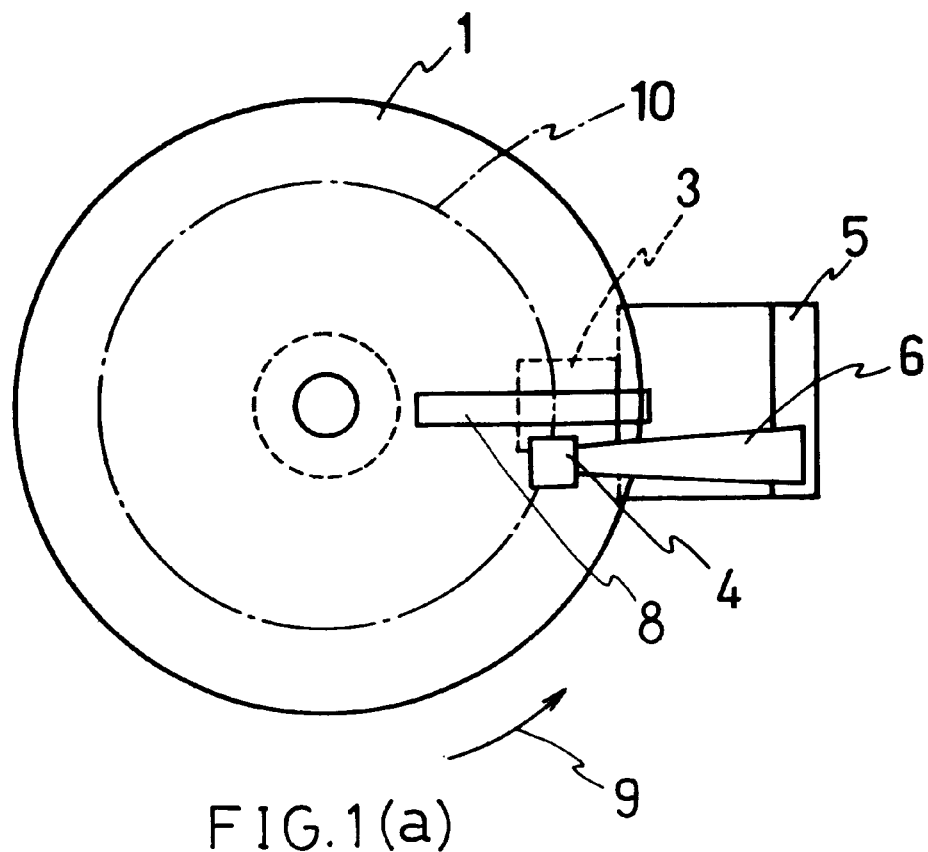
FIG. 1(a) is a plan view showing a configuration of a first embodiment of a magneto-optical disc apparatus of this invention.
Figure 1B:
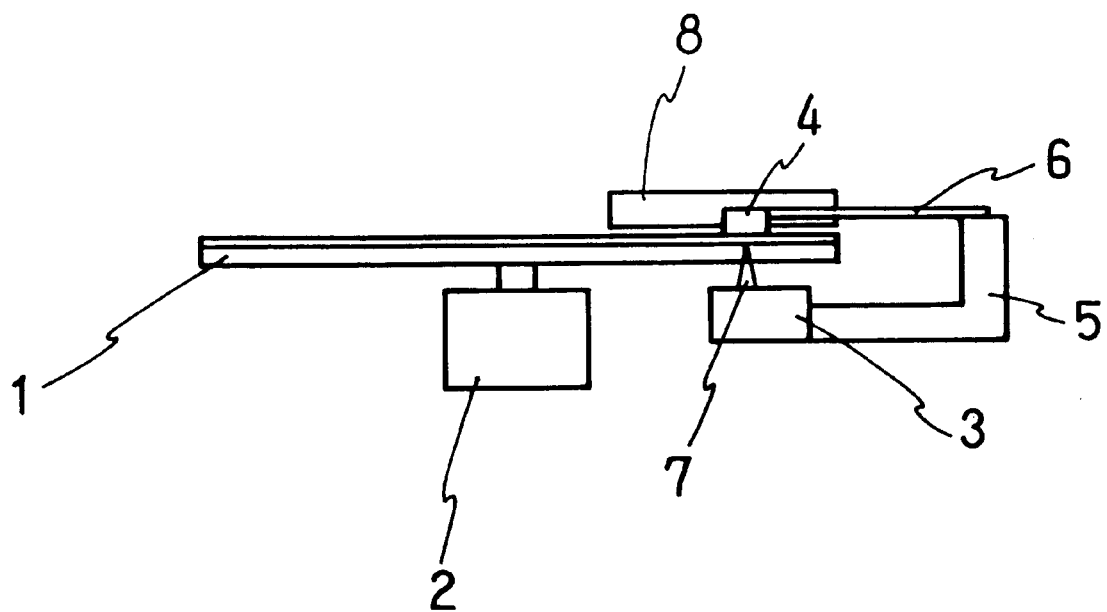
FIG. 1(b) is a side view of the magneto-optical disc apparatus sown in FIG. 1(a)

A first embodiment of a megneto-optical disc apparatus of this invention is described with reference to FIG. 1(a) (plan view) and FIG. 1(b) (side view). As can be seen from FIGS. 1(a) and 1(b), the magneto-optical disc apparatus comprises a magneto-optical disc 1, a spindle motor 2 for rotating the magneto-optical disc 1, an optical head 3, a first magnetic field generator 4, a link arm 5, a suspension 6, and a second magnetic field generator 8. Numeral 7 designates a light beam emitted from the optical head 3 in FIG. 1(b). The magneto-optical disc 1 rotates in counterclockwise direction as shown by arrow 9 in FIG. 1(a). Numeral 10 designates a track on the magneto-optical disc 1 in FIG. 1(a). The magneto-optical disc 10 includes a magneto-optical recording medium having at least two layers respectively having different coercive forces, for example Hc1 and Hc2 at room temperature.

There are three types of the magneto-optical disc 1 which can be used in the magneto-optical disc apparatus of this invention. A first magneto-optical disc 1 (hereinafter abbreviated as A-type disc) relates to a direct overwriting system similar to the magneto-optical disc used in the first prior art technique. The A-type disc comprises a magneto-optical recording medium formed on a substrate made of resin such as a polycarbonate. The magneto-optical recording medium has a multi layer structure including a recording and reproducing layer having vertical magnetic anisotropy, and a supplemental recording layer having a different coercive force from that of the recording and reproducing layer.

A second magneto-optical disc 1 (hereinafter abbreviated as B-type disc) corresponds to the magnetically induced super resolution (MSR) method similar to the magneto-optical disc used in the second prior art technique. In particular, the B-type disc relates to the RAD or D-RAD method which requires an initializing magnetic field. In the MSR method, data can be read out from a region narrower than the area of the light beam spot, so that the recording density (specifically, reproducing density) can be increased.

A third magneto-optical disc 1 (hereinafter abbreviated as C-type disc) has a single use for reproduction similar to the magneto-optical disc used in the third prior art technique. The C-type disc can have a high reproducing density using the MSR method.

In the A-type disc and the B-type disc, the magneto-optical recording medium is formed by a plurality of magnetic layers respectively having different coercive forces. In the C-type disc, however, the coercive force in a magnetic layer positioned above the marked portions is different from that in the same magnetic layer positioned above the non-marked portions. In this invention, these three types of the magneto-optical disc can be used, and the initializing magnetic field is necessary in each case.

The spindle motor 2 rotates the magneto-optical disc 1 in counterclockwise direction sown by arrow 9. The optical head 3 is moved by an driving mechanism (not shown in the figure) for accessing a desired position on the magneto-optical disc 1. When the magneto-optical disc 1 is a A-type or B-type, the optical head 3 records and reproduces the data about the magneto-optical disc 1. On the other hand, when the magneto-optical disc 1 is a C-type, the optical head 3 only reproduces the data from the magneto-optical disc 1. The light beam 7 is irradiated on a surface of a magneto-optical recording medium of the magneto-optical disc 1 for recording and reproducing the data. With respect to the magneto-optical disc 1 is C-type of single use for reproduction, the light beam 7 is correctly irradiated on the reproducing medium. However, the data is previously recorded on the reproducing medium. Thus, the term "recording medium" used in this disclosure includes not only "recording" but also "reproducing".

The optical head 3 is connected to the link arm 5. The first magnetic field generator 4 is connected to the link arm 5 via suspension 6 having elasticity. The suspension 6 and the link arm 5 are connected by a hinge (not shown in the figure) by which the first magnetic field generator 4 is raised when the magneto-optical disc 1 is interchanged. Thus, the first magnetic field generator 4 moves corresponding to the access movement of the optical head 3. A permanent magnet is mounted on the first magnetic field generator 4. The first magnetic field generator 4 slides on or floats above the surface of the magneto-optical disc 1.

The first magnetic field generator 4 and the optical head 3 are respectively positioned above and below the magneto-optical disc 1 and facing to each other via the magneto-optical disc 1. Furthermore, the first magnetic field generator 4 and the optical head 3 are positioned in ahead of or behind the light beam spot due to the light beam 7. In the first embodiment, the first magnetic field generator 4 is positioned in ahead of the light beam spot.

The light beam 7 is focused on the track 10 on the magneto-optical disc 1, so that the first magnetic field generator 4 should be positioned in a manner so as to apply the magnetic field on the track 10. As can be seen from FIGS. 1(a) and 1(b), the optical head 3 moves along a line crossing the rotation axis of the magneto-optical disc 1, that is the radial direction of the magneto-optical disc 1. On the other hand, the first magnetic field generator 4 moves in parallel with the movement of the optical head 3. Accordingly, with respect to the access point on the magneto-optical disc 1 by the first magnetic field generator 4 or the radius of the track 10, a minute discrepancy occurs between the position of the light beam 7 by the optical head 3 and the position of the first magnetic field generator 4. Thus, the area of a magnetic field generated by the first magnetic field generator 4 should cover a predetermined scope.

The second magnetic field generator 8 is disposed so as to cover all the tracks on the magneto-optical disc 1. When the magneto-optical disc 1 is a A-type, the second magnetic field generator 8 serves as a biasing magnetic field generator, and capable of generating the direct magnetic field having the intensity of about 300 oersted. Accordingly, a bar shaped permanent magnet can preferably be used for the second magnetic field generator 8. Furthermore, since the demanded intensity of the magnetic field is small, an electromagnet can be used for the second magnetic field generator 8. The distance between the second magnetic field generator 8 and the magneto-optical disc 1 is preferably about 1 mm.

When the magneto-optical disc 1 is the B-type, the second magnetic field generator 8 serves as a biasing magnetic field generator for generating the biasing magnetic field in the erasing and recording operation of the data, and a reproducing magnetic field generator for generating a necessary reproducing magnetic field in the reproducing operation of the data. Since the polarity of the magnetic field must be changed corresponding to the recording and the erasing operation of the data, a rotatable bar shaped permanent magnet or an electromagnet is preferably used as the second magnetic field generator 8.

When the magneto-optical disc 1 is the C-type, the second magnetic field generator 8 is used for reversing the magnetization in the non-marked portions on the magneto-optical disc where the coercive force is small. Thus, a bar shaped permanent magnet or an electromagnet can preferably be used as the second magnetic field generator 8.

Figure 2A:
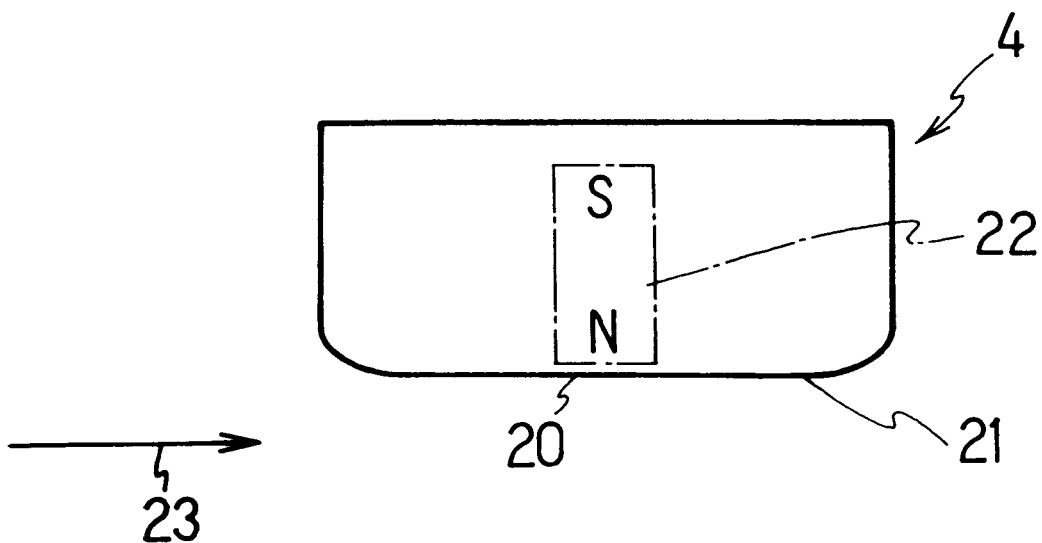
FIG. 2(a) is a side view showing a configuration of a sliding type magnetic field generator used in the first embodiment.
Figure 2B:
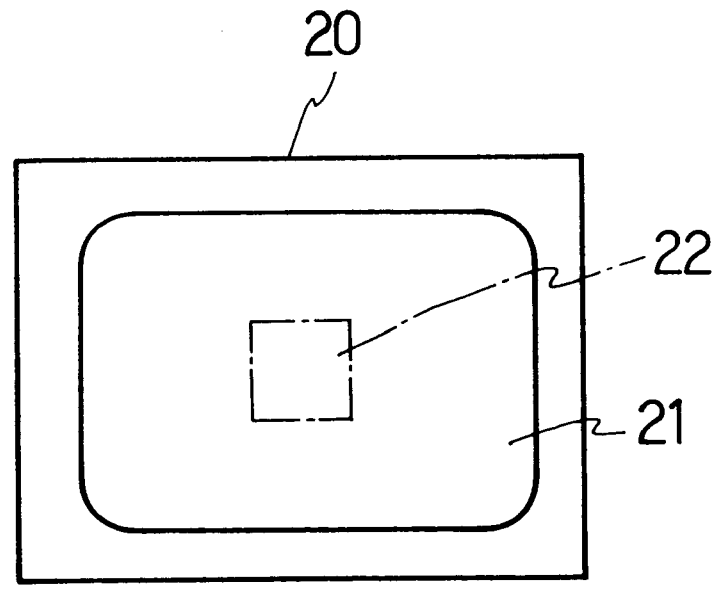
FIG. 2(b) is a plan view of the magnetic field generator shown in FIG. 2(a)
Figure 3A:
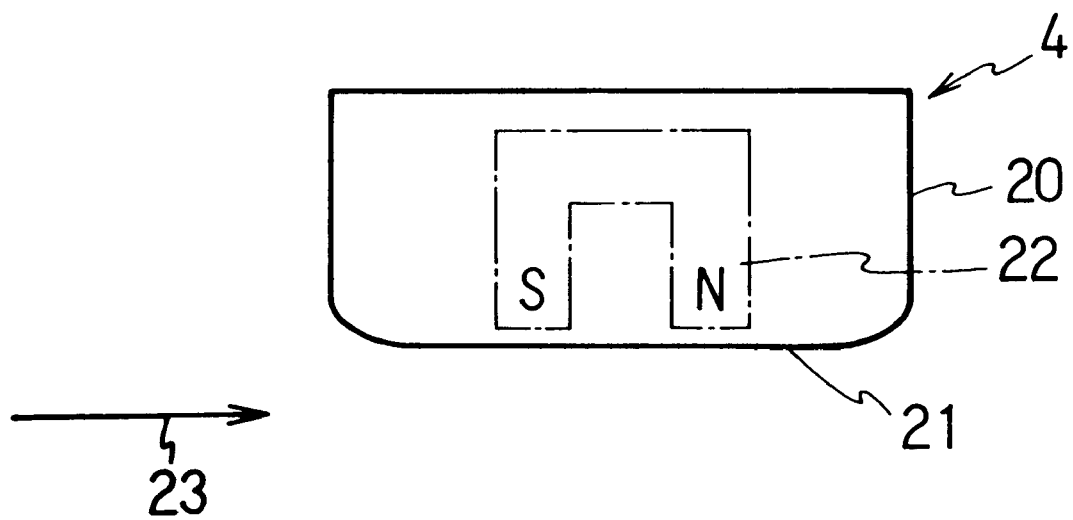
FIG. 3(a) is a side view showing another configuration of a sliding type magnetic field generator used in the first embodiment.
Figure 3B:
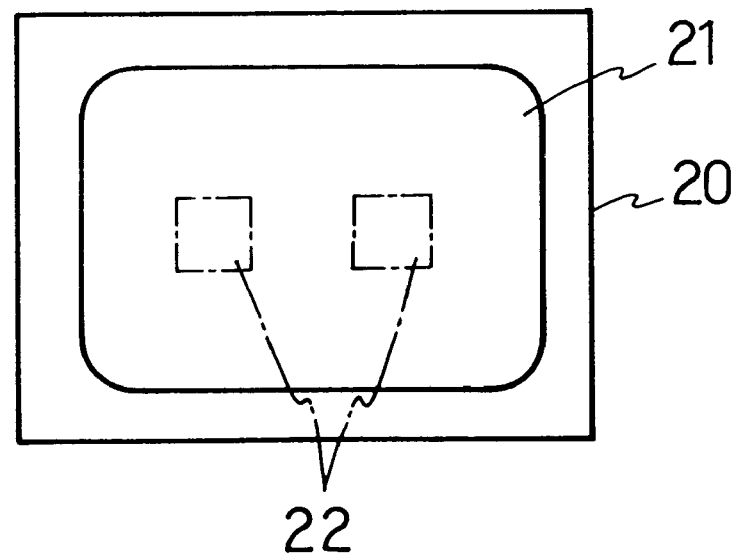
FIG. 3(b) is a plan view of the magnetic field generator shown in FIG. 3(a)

Detailed configuration of the first magnetic field generator 4 will be described referring to FIGS. 2(a) to 5(b). FIG. 2(a) is the side view of the sliding type first magnetic field generator 4, and FIG. 2(b) is the plan view thereof FIG. 3(a) is the side view of the sliding type first magnetic field generator 4, and FIG. 3(b) is the plan view thereof The configuration on a magnet 22 disposed inside the first magnetic field generator 4 shown in FIGS. 2(a) and 2(b) is different from that shown in FIGS. 3(a) and 3(b).

As can be seen from the figures, in the first magnetic field generator 4, chamber is provided on the molded block 20 for forming a sliding face 21, and a permanent magnet 22 is provided inside the molded block 20. The sliding direction of the first magnetic field generator 4 is designated by reference numeral 23. When the intensity of the magnetic field needs more than 2 kilooersted, a permanent magnet made of a rare earth material is preferably used as the magnet 22. The permanent magnet 22 is mounted on the molded block 20 in a manner so that a surface of the magnet 22 is a little hollowed in order not to protrude from the sliding surface 21. In the figures, the suspension 6 is omitted. However, the conventional suspension used in the widely used floppy disc drive can be used as the suspension 6. In the embodiment shown in FIGS. 2(a) and 2(b), a bar shaped permanent magnet is preferably used as the magnet 22. In another embodiment shown in FIGS. 3(a) and 3(b), a U-shaped permanent magnet is used as the magnet 22. In case of using the U-shaped permanent magnet, the intensity of the magnetic field can be made larger than where a bar shaped magnet is used. The shapes of the permanent magnet 22 are not restricted by these embodiments, and other shapes can be designed corresponding to the objective of the magneto-optical disc apparatus.

Figure 4A:
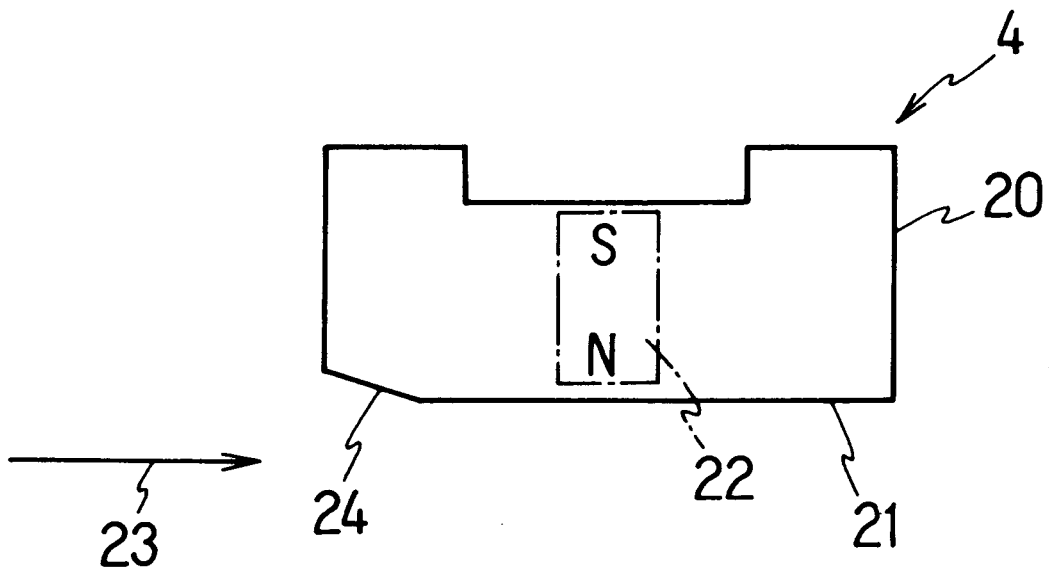
FIG. 4(a) is a side view showing a configuration of a floating type magnetic field generator used in the first embodiment.
Figure 4B:
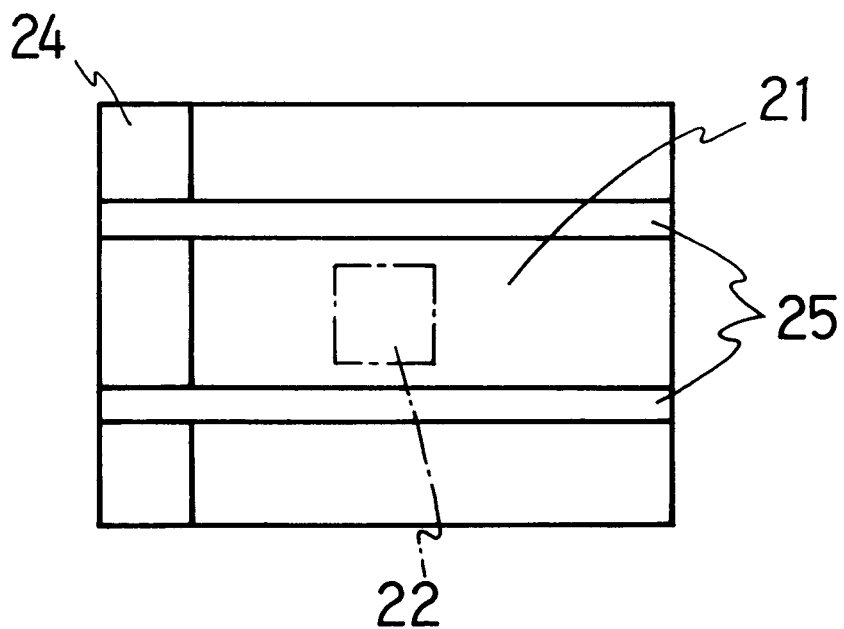
FIG. 4(b) is a plan view of the magnetic field generator shown in FIG 1(a)
Figure 5A:
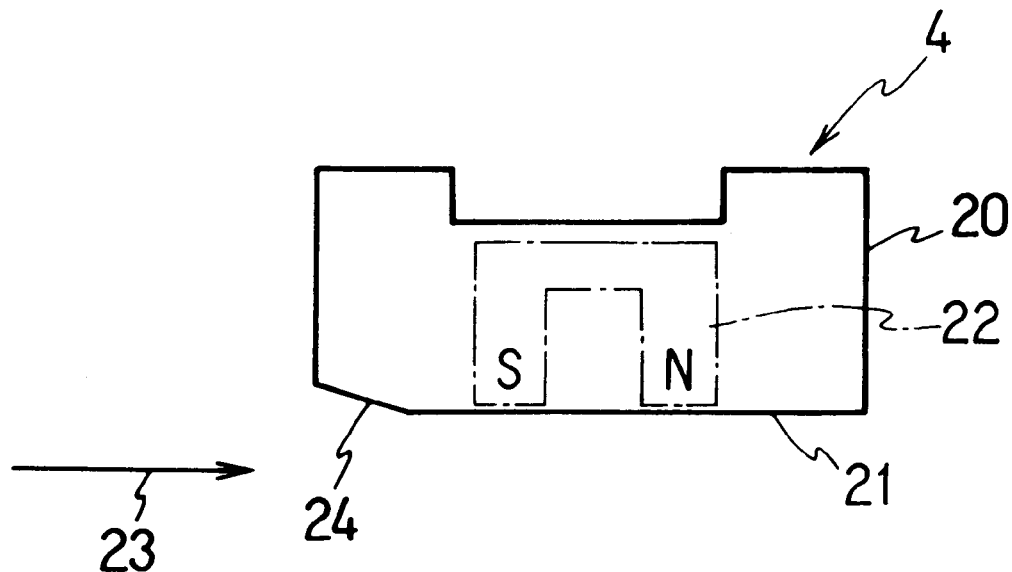
FIG. 5(a) is a side view showing another configuration of a floating type magnetic field generator used in the first embodiment.
Figure 5B:
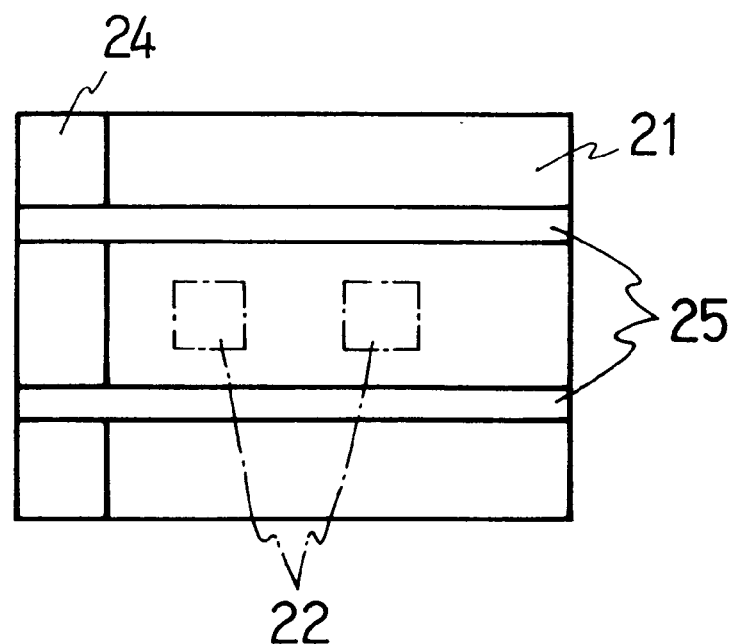
FIG. 5(b) is a plan view of the magnetic field generator shown in FIG. 5(a)

FIG. 4(a) is the side view of the floating type first magnetic field generator 4, and FIG. 4(b) is the plan view thereof FIG. 5(a) is the side view of the floating type first magnetic field generator 4, and FIG. 5(b) is the plan view thereof The configuration on a magnet 22 disposed inside the first magnetic field generator 4 shown in FIGS. 4(a) and 4(b) is different from that shown in FIGS. 5(a) and 5(b).

As can be seen from the figures, the floating type first magnetic field generator 4 has characteristics on the sliding surface 21. An air intake 24 is formed at the front end of the sliding surface 21 for taking the air for floating the first magnetic field generator 4. Furthermore, in order to stabilize the floating of the first magnetic field generator 4, grooves 25 are formed on the sliding surface 21. The other configurations are substantially the same as the above-mentioned sliding types. The floating type first magnetic field generator 4 is suitable to the magneto-optical disc apparatus in which the magneto-optical disc 1 rotates in a high speed, since the floating first magnetic field generator does not significantly damage the surface of the magneto-optical disc 1.

Since the first magnetic field generator 1 in the magneto-optical disc apparatus according to the first embodiment is the sliding type or the floating type, the distance between the sliding surface 21 of the first magnetic field generator 4 and the surface of the magneto-optical disc 1 is very short. Thus, the permanent magnet or the electromagnet can be made smaller for generating the necessary intensity of the magnetic field in the magneto-optical recording medium of the magneto-optical disc 1. Furthermore, since the size of the permanent magnet or the electromagnet can be decreased, they can readily be mounted inside the first magnetic field generator 4. An area for facing the magneto-optical disc 1 can be made a square of about two or less millimeters, so that the initializing magnetic field generator has sufficient room to be disposed in the conventional ISO 3.5 inch type magneto-optical disc apparatus. As a result, the magnetic field generator of this invention has a number of degrees of freedom of design in comparison with the conventional magnetic field generator, and the downsizing of the magneto-optical disc apparatus can be achieved.

Second Embodiment

Figure 6A:
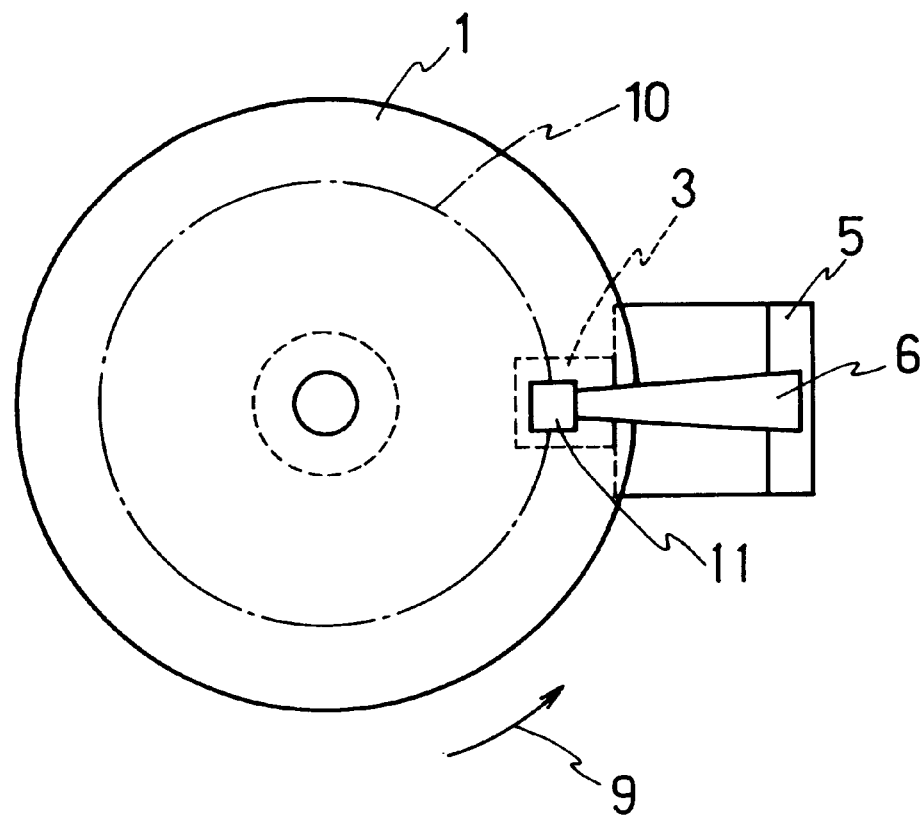
FIG. 6(a) is a plan view showing a configuration of a second embodiment of a magneto-optical disc apparatus of this invention.
Figure 6B:
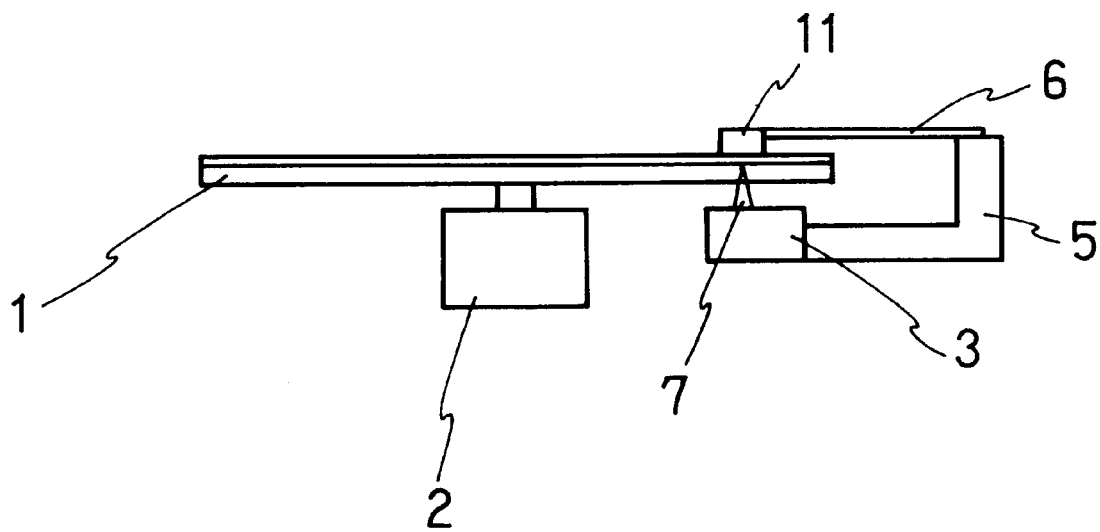
FIG. 6(b) is a side view of the magneto-optical disc apparatus shown in FIG. 6(a)
Figure 8A:
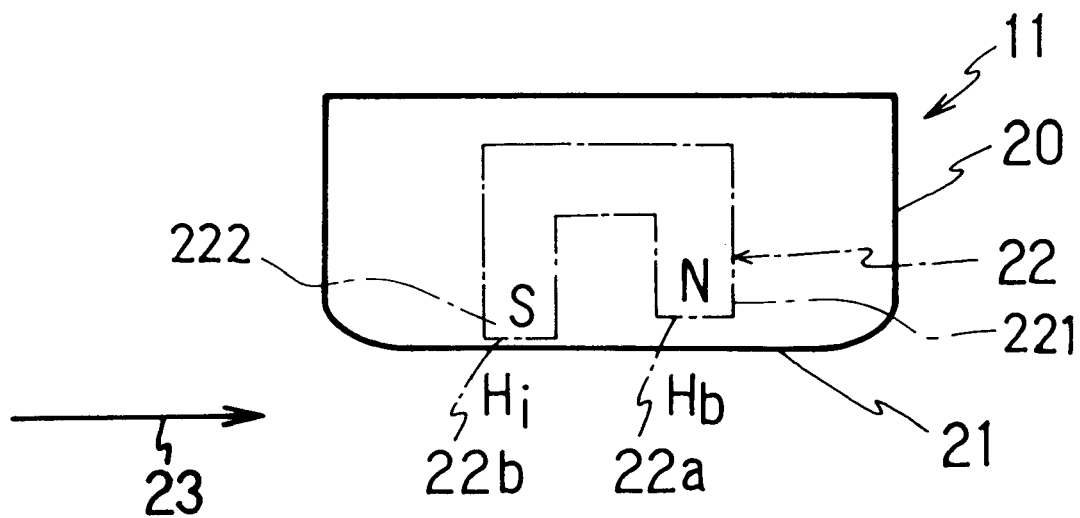
FIG. 8(a) is a side view showing another configuration of a sliding type magnetic field generator used in the second embodiment.
Figure 8B:
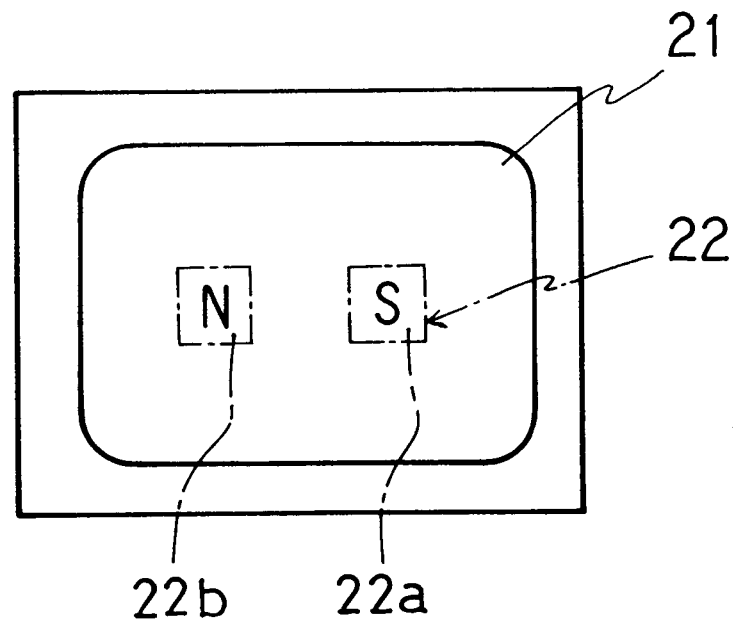
FIG. 8(b) is a plan view of the magnetic field generator shown in FIG. 8(a)

A second embodiment of a magneto-optical disc apparatus of this invention is illustrated by way of FIG. 8(a) (plan view) and FIG. 6(b) (side view). As can be seen from FIGS. 6(a) and 6(b), the magneto-optical disc apparatus comprises a magneto-optical disc 1, a spindle motor 2 for rotating the magneto-optical disc 1, an optical head 3, a magnetic field generator 11, a link arm 5, and a suspension 6. Numeral 7 designates a light beam emitted from the optical head 3 in FIG. 6(b). The magneto-optical disc 1 rotates in counter-clockwise direction as shown by arrow 9 in FIG. 6(a). Numeral 10 designates a track on the magneto-optical disc 1 in FIG. 6(a).

The above-mentioned magneto-optical disc apparatus according to the first embodiment requires a first magnetic field generator 4 for generation an intense magnetic field and a second magnetic field generator 8 for generating a weak magnetic field. On the other hand, in the magneto-optical disc apparatus according to the second embodiment, the magnetic field generators for the intense magnetic field and for the weak magnetic field are commonly integrated in the same magnetic field generator 11. Thus, the mechanical movement of the magnetic field generator 11 in the second embodiment in the interchanging of the magneto-optical disc 1 is substantially the same as the movement of the first magnetic field generator 4 in the first embodiment. Furthermore, the other configurations of the magneto-optical disc apparatus according to the second embodiment are substantially the same as those of the above mentioned magneto-optical disc apparatus according to the first embodiment, so that the explanation of them are omitted. The kinds of the magneto-optical disc 1 used in the second embodiment correspond to the A-type, B-type and C-type discs described with respect to the first embodiment.

Figure 7A:
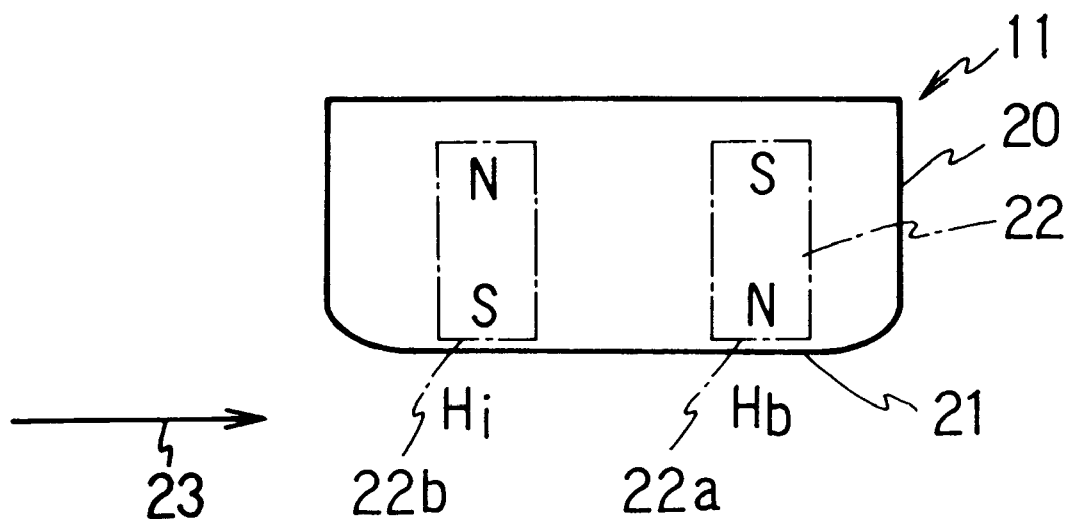
FIG. 7(a) is a side view showing a configuration of a sliding type magnetic field generator used in the second embodiment.
Figure 7B:
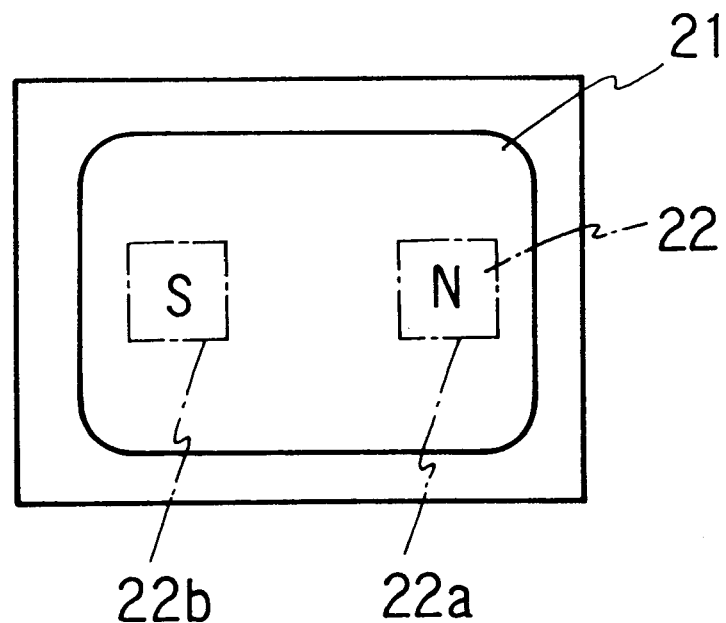
FIG. 7(b) is a plan view of the magnetic field generator shown in FIG. 7(a)

Detailed configuration of the magnetic field generator 11 in the magneto-optical disc apparatus according to the second embodiment is described referring to the FIG. 7(a) to FIG. 12(b). FIG. 7(a) is the side view of the sliding type magnetic field generator 11 in which only a permanent magnet is mounted, and FIG. 7(b) is the plan view thereof FIG. 8(a) is the side view of the sliding type magnetic field generator 11 in which only a permanent magnet is mounted, and FIG. 8(b) is the plan view thereof. Both embodiments of the magnetic field generator 11 are used for the A-type and C-type magneto-optical disc, since the fixed magnetic field is used for reproducing the magneto-optical disc of A-type and C-type, and the source for generating the magnetic field mounted in the magnetic field generator 11 is the permanent magnet which can not be changed the direction of the magnetic field. The configuration of the permanent magnets 22 disposed inside the magnetic field generator 11 shown in FIGS. 7(a) and 7(b) is different from those shown in FIGS. 8(a) and 8(b).

In both embodiments, a plurality of magnetic poles 22a, 22b appears on the sliding surface 21. In the embodiment shown in FIGS. 7(a) and 7(b), a plurality of, for example, two bar shaped permanent magnets 22 are mounted inside the molded block 20 of the magnetic field generator 11. In the embodiment shown in FIGS. 8(a) and 8(b), a permanent magnet 22 having a channel shaped cross-section is mounted inside the molded block 20 of the magnetic field generator 11. One magnetic pole, for example, 22a is disposed in a manner so as to apply a magnetic field on a position of light beam irradiation on the magneto-optical disc 1. When the intensity of the magnetic field due to the magnetic pole 22a is Hb and the intensity of the initializing magnetic field due to the magnetic pole 22b is Hi, the intensity Hb and Hi are set to be Hb<Hi. In the embodiment shown in FIGS. 7(a) and 7(b), two permanent magnets 22 respectively having different magnetization are prepared with the one having the weaker magnetization being disposed at the position of the magnetic pole 22a. In the embodiment shown in FIGS. 8(a) and 8(b), for reducing the intensity of the magnetic field Hb by the magnetic pole 22a, a leg 221 of the permanent magnet 22 disposed on the side of the magnetic pole 22a is largely hollowed from the sliding surface 21 than a leg 222 disposed on the side of the other magnetic pole 22b.

Figure 9A:
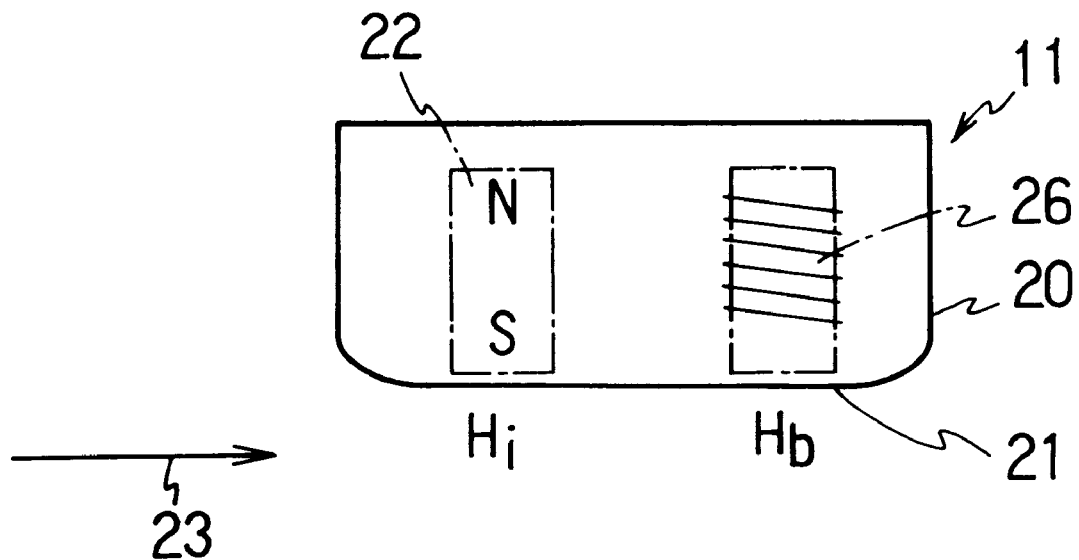
FIG. 9(a) is a side view showing still another configuration of a sliding type magnetic field generator used in the second embodiment.
Figure 9B:
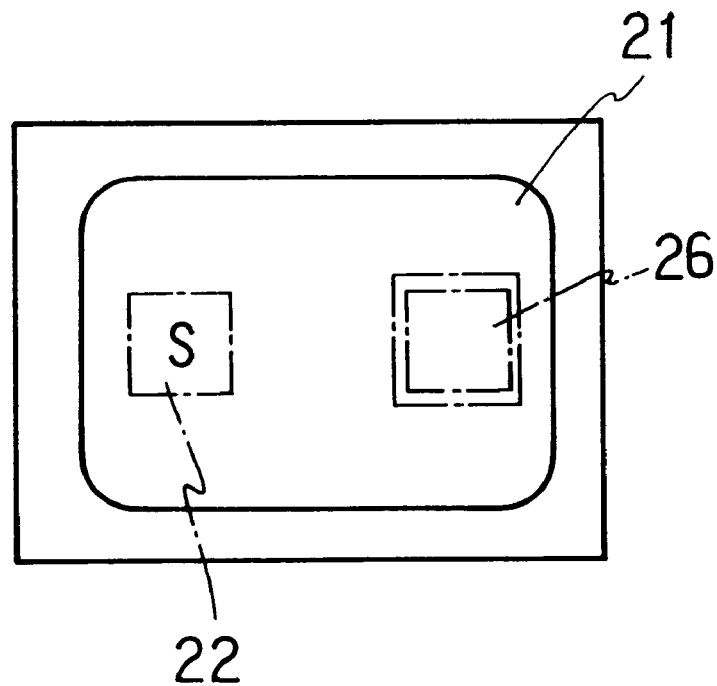
FIG. 9(b) is a plan view of the magnetic field generator shown in FIG. 9(a)

FIG. 9(a) is the side view of the sliding type magnetic field generator 11 in which a permanent magnet 22 and an electromagnet 26 are mounted, and FIG. 9(b) is the plan view thereof The magnetic field generator 11 shown in FIGS. 9(a) and 9(b) is used for the magneto-optical disc of B-type. By changing the polarity of the electromagnet 26, the biasing magnetic fields for recording and erasing operation of the data can be generated. The reproducing magnetic field is also generated by the electromagnet 26 in reproducing operation of the data. The electromagnet 26 is disposed so as to apply the biasing magnetic field in erasing the data and the reproducing magnetic field in reproducing the data at a position of the light beam irradiation on the magneto-optical disc 1.

Figure 10A:
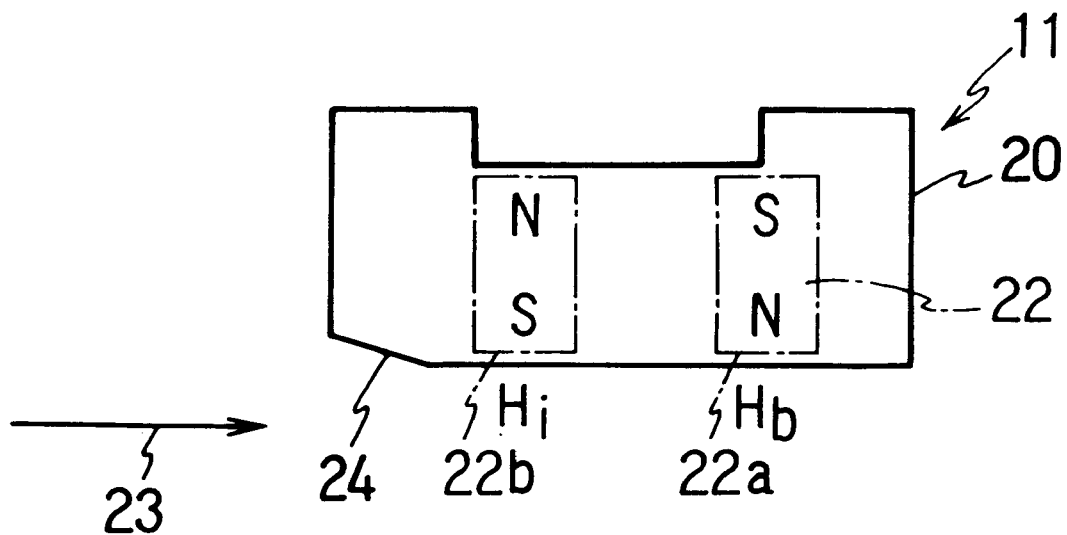
FIG. 10(a) is a side view showing a configuration of a floating type magnetic field generator used in the second embodiment.
Figure 10B:
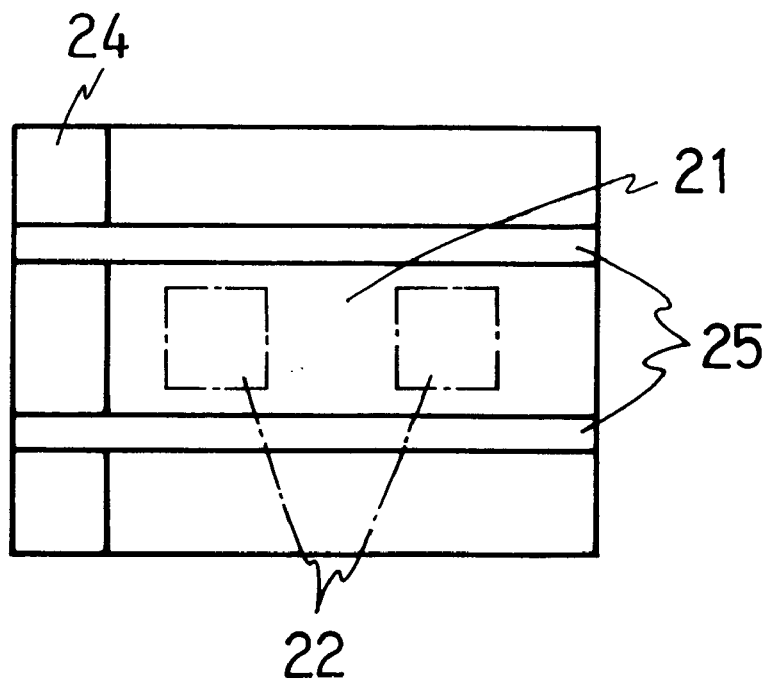
FIG. 10(b) is a plan view of the magnetic field generator shown in FIG. 10(a)
Figure 11A:
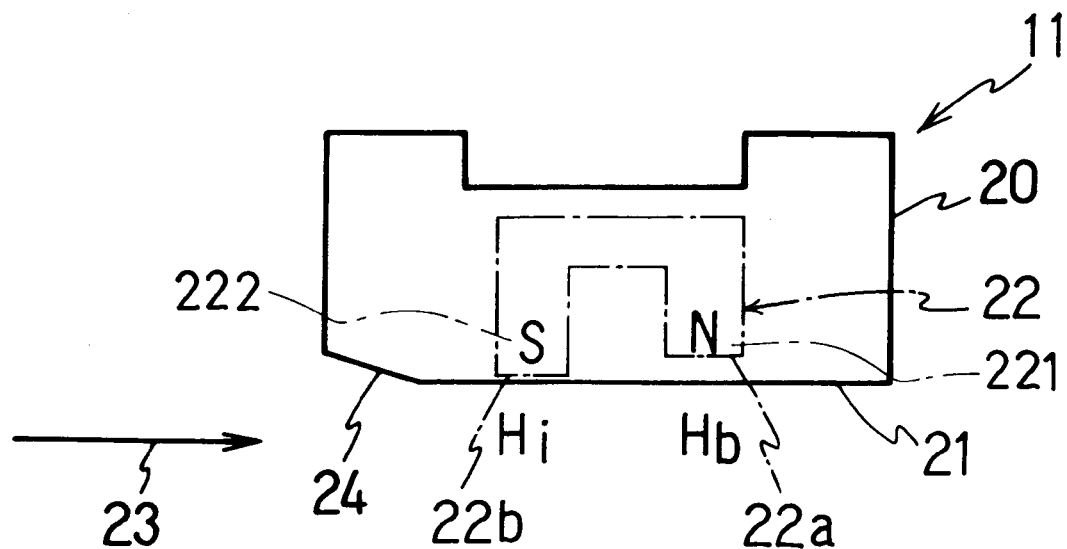
FIG. 11(a) is a side view showing another configuration of a floating type magnetic field generator used in the second embodiment.
Figure 11B:
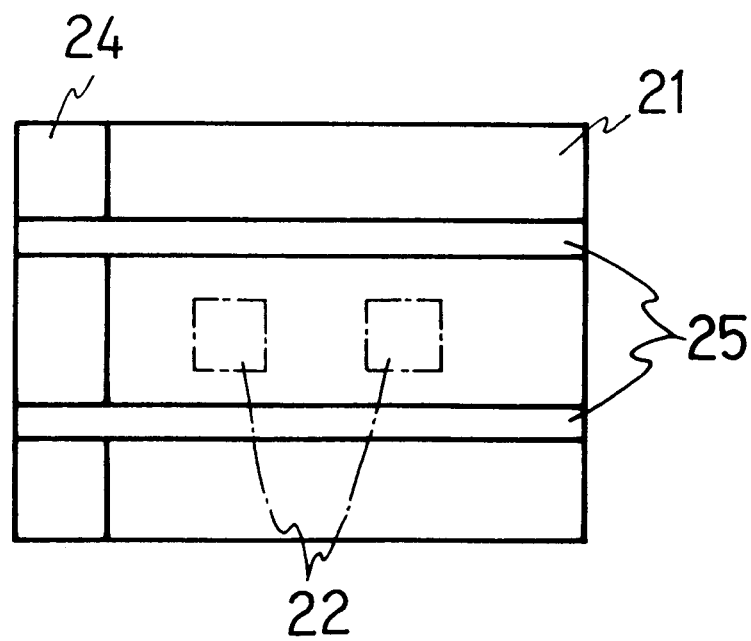
FIG. 11(b) is a plan view of the magnetic field generator shown in FIG. 11(a)

FIG. 10(a) is the side view of the floating type magnetic field generator 11 in which only two permanent magnets 22 are mounted, and FIG. 10(b) is the plan view thereof FIG. 11(a) is the side view of the floating type magnetic field generator 11 in which only a permanent magnet 22 is mounted, and FIG. 11(b) is the plan view thereof Both embodiments of the magnetic field generator 11 are used for the A-type and C-type magneto-optical disc similar to the above-mentioned embodiments shown in FIGS. 7(a), 7(b), 8(a) and 8(b), since the fixed magnetic field is used for reproducing the magneto-optical disc of A-type and C-type, and the source for generating the magnetic field mounted in the magnetic field generator 11 is the permanent magnet which can not be changed the direction of the magnetic field. The configuration of the permanent magnets 22 disposed inside the magnetic field generator 11 shown in FIGS. 10(a) and 10(b) is different from those shown in FIGS. 11(a) and 11(b).

Figure 12A:
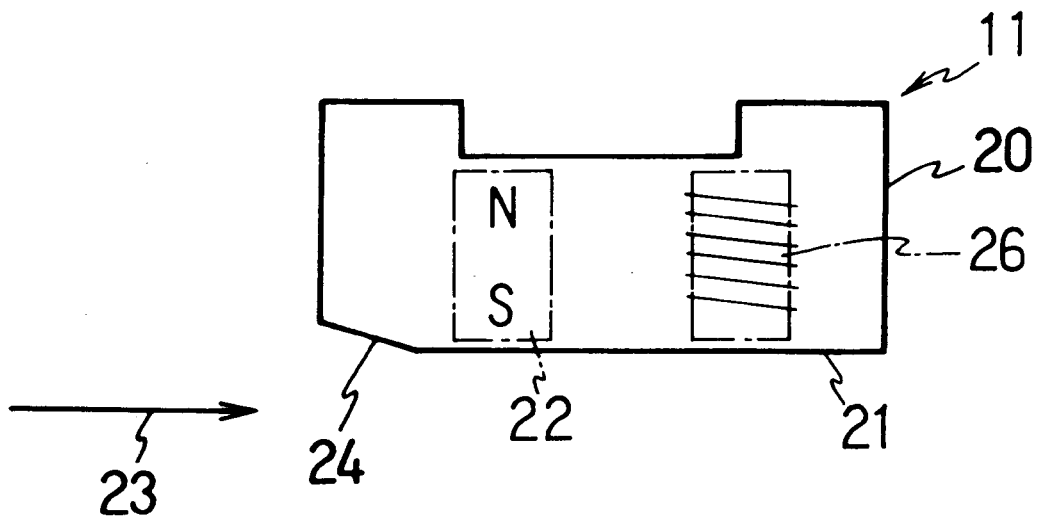
FIG. 12(a) is a side view showing still another configuration of a floating type magnetic field generator used in the second embodiment.
Figure 12B:
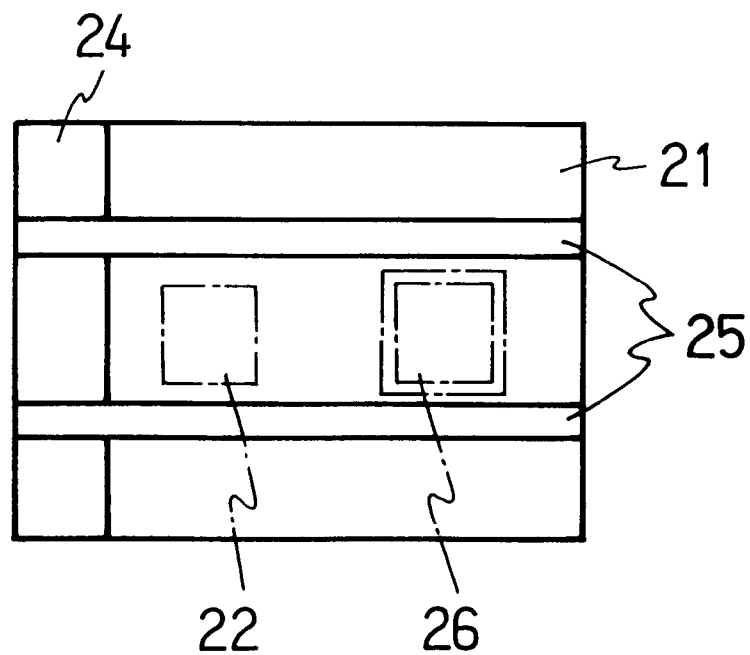
FIG. 12(b) is a plan view of the magnetic field generator shown in FIG. 12(a)
Figure 13:
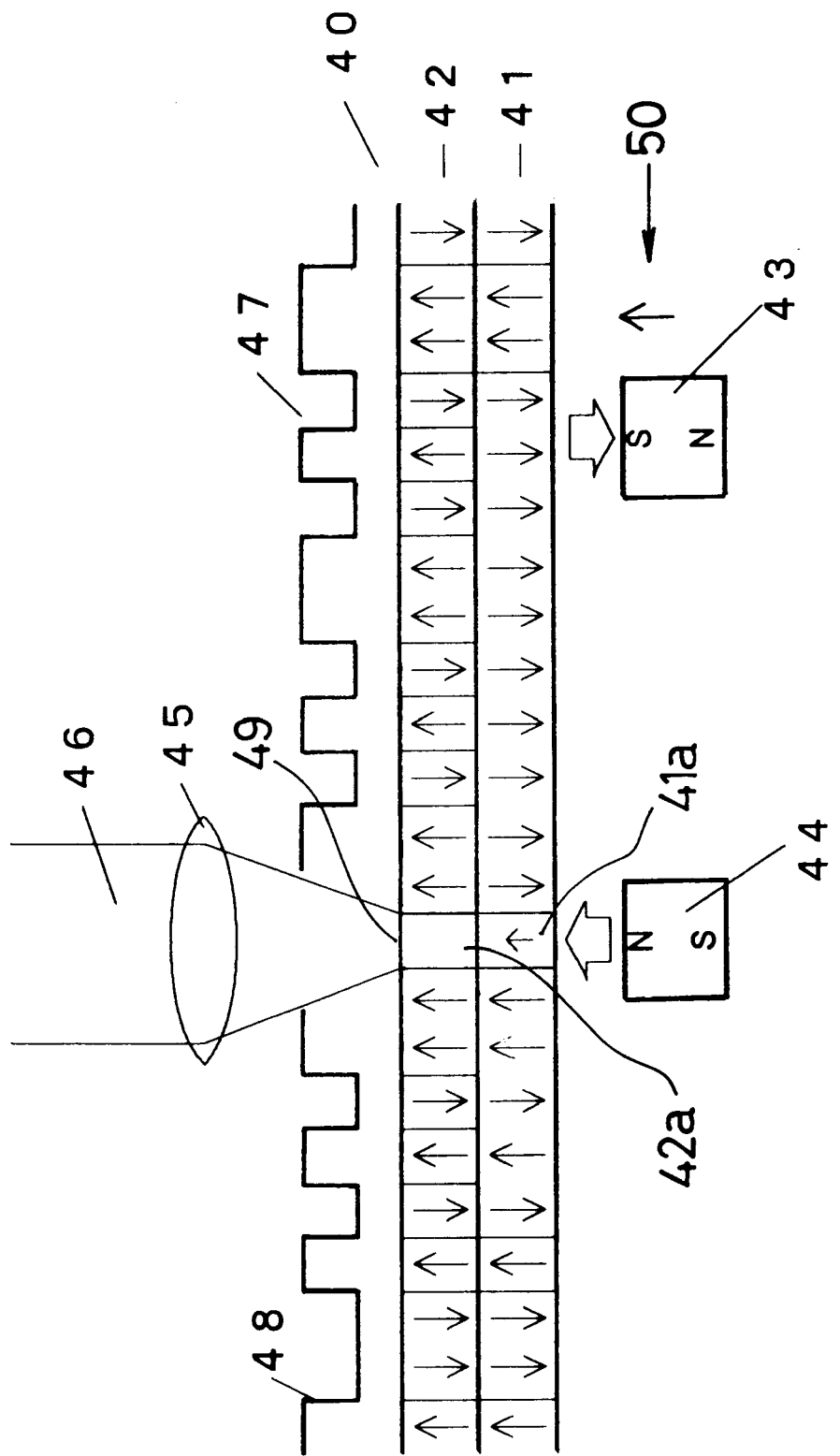
FIG. 13 is the drawing for showing the principle of the conventional light modulating method.
Figure 14A:
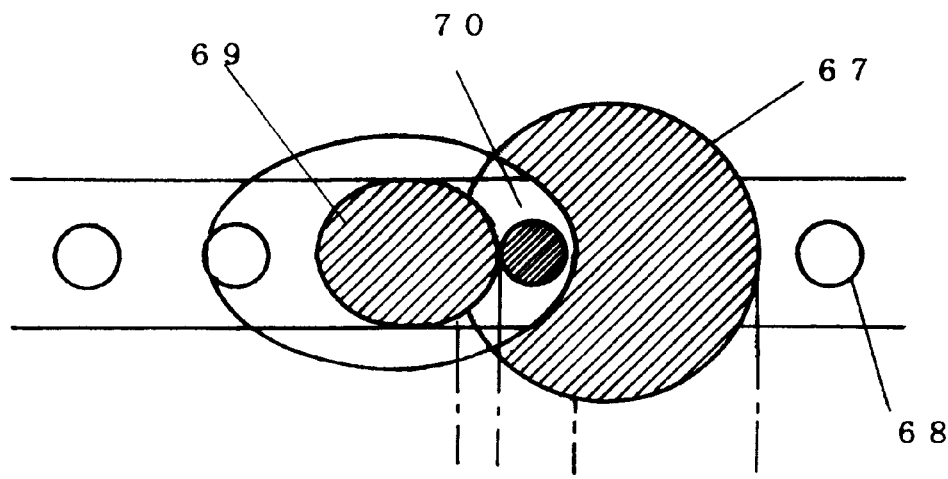
FIG. 14 is a drawing for showing the principle of the conventional magnetically induced super resolution technique of the double mask rear aperture detection method.
Figure 14B:
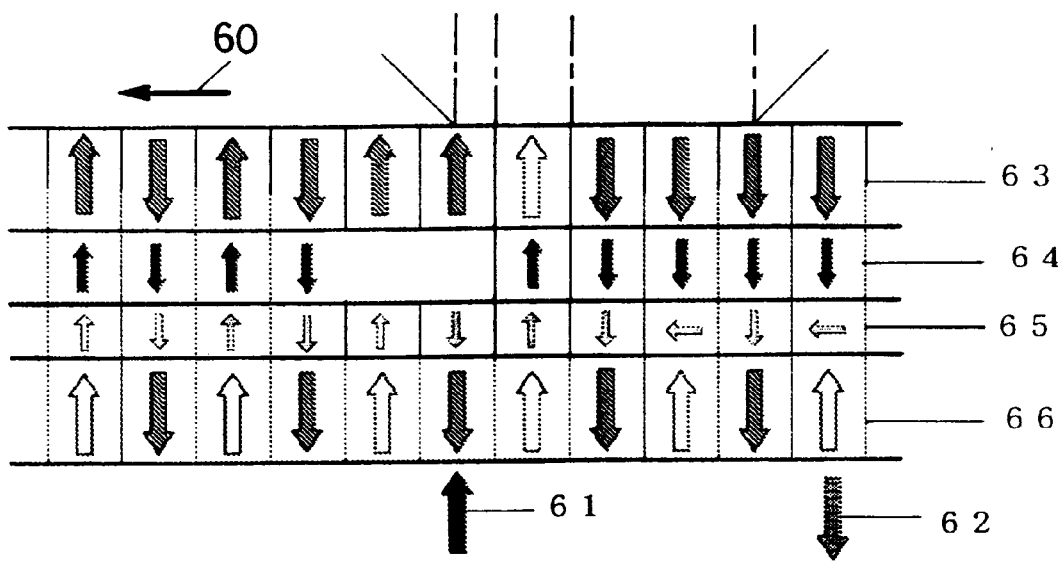

FIG. 12(a) is the side view of the floating type magnetic field generator 11 in which a permanent magnet 22 and an electromagnet 26 are mounted, and FIG. 12(b) is the plan view thereof. As can be seen from the figures, the floating type magnetic field generator 11has characteristics on the sliding surface 21. An air intake 24 is formed at the front end of the sliding surface 21 for taking the air for floating the magnetic field generator 11. Furthermore, in order to stabilize the floating of the magnetic field generator 11, grooves 25 are formed on the sliding surface 21. The other configurations are substantially the same as the above-mentioned sliding types shown in FIGS. 7(a) to 9(b). The floating type magnetic field generator 11 is suitable to the magneto-optical disc apparatus in which the magneto-optical disc 1 rotates in a high speed, since the floating first magnetic field generator does not damage the surface of the magneto-optical disc 1 so much.

As mentioned above, the magneto-optical disc apparatus according to the second embodiment can generate a plurality of magnetic fields about respective A-type, B-type and C-type of magneto-optical discs with only one magnetic field generator 11. Thus, more compact magneto-optical disc apparatus can be provided. Especially, the electromagnet 26 mounted inside the magnetic field generator 11 as shown in FIGS. 9(a), 9(b), 12(a) and 12(b) is very compact, so that the consuming of the electric power becomes very smaller than that of the conventional apparatus using a large fixed electromagnet.

Furthermore, in the above-mentioned first and second configurations, the configurations or shapes of the permanent magnet 22 and/or the electromagnet 26 are not restricted in the embodiment shown in the figures. The polarity of the magnets shown by symbols of "S" and "N" in the figures are conveniently used, and the polarity of the magnet can be changeable responding to the configuration or kinds of the magnetic layer of the magneto-optical discs 1 which is used in the magneto-optical disc apparatus of this invention.

The invention may be embodied in other specific forms without departing from the spirit and scope thereof The embodiments are to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. A magneto-optical disc apparatus, comprising a rotating magneto-optical disc including a magneto-optical recording medium having, at least two kinds of coercive forces at room temperature;

an optical head moving in a radial direction relative to the magneto-optical disc and irradiating a light beam spot on a track on the magneto-optical disc; and a magnetic field generator including at least a permanent magnet in sliding connection with a surface of the magneto-optical disc, so that the magnetic field generator slides in correspondence with the motion of the optical head to apply a magnetic field at a position on the track which is ahead of or behind the light beam spot.

2. The magneto-optical disc apparatus according to claim 1, wherein the magnetic field generator generates a magnetic field having an intensity that is larger than at least one coercive force of the magneto-optical recording medium and smaller than at least one or the remained coercive forces of the magneto-optical recording medium.

3. The magneto-optical disc apparatus according to claim 1, wherein the magnetic field generator has a plurality of magnetic field generating portions on a surface facing the magneto-optical disc, an intensity or a magnetic field generated by one of the magnetic field generating portion is larger than at least one coercive force of the magneto-optical recording medium, and an intensity of a magnetic field generated by one of other magnetic field generating portions is smaller than at least one of remained coercive forces of the magneto-optical recording medium.

4. A magneto-optical disc apparatus, comprising a rotating magneto-optical disc including a magneto-optical recording medium having at least two kinds of coercive forces at room temperature;

an optical head moving in a radial direction relative to the magneto-optical disc and irradiating a light beam spot on a track on the magneto-optical disc; and a magnetic field generator including at least a permanent magnet in floating connection with a surface of the magneto-optical disc due to aerodynamic forces caused by rotation of the magneto-optical disc, so that the magnetic field generator floats in correspondence with the motion of the optical head to apply a magnetic field at a position on the track which is ahead of or behind the light beam spot.

5. The magneto-optical disc apparatus according to claim 4, wherein the magnetic field generator generates a magnetic field having an intensity that is larger than at least one coercive force of the magneto-optical recording medium and smaller than at least one of the remained coercive forces of the magneto-optical recording medium.

6. The magneto-optical disc apparatus according to claim 4, wherein the magnetic field generator has a plurality of magnetic field generating portions on a surface facing the magneto-optical disc, an intensity of a magnetic field generated by one of the magnetic field generating portion is larger than at least one coercive force of the magneto-optical recording medium, and an intensity of a magnetic field generated by one of other magnetic field generating portions is smaller than at least one of remained coercive forces of the magneto-optical recording medium.

7. The magneto-optical disc apparatus according to claim 4, wherein the magnetic field generator has a sliding surface facing the surface of the magneto-optical disc, a tapered portion is formed at the front end of the sliding surface for taking air for floating and grooves are formed on the sliding surface for stabilizing floating of the magnetic field generator.

8. A magneto-optical disc apparatus, comprising a rotating magneto-optical disc including a magneto-optical recording medium configured by at least two magnetic layers respectively having a magnetic exchange interaction;

an optical head moving in a radial direction relative to the magneto-optical disc and irradiating a light beam spot on a track on the magneto-optical disc; and a magnetic field generator including at least a permanent magnet in sliding connection with a surface of the magneto-optical disc, so that the magnetic field generator slides in correspondence with the motion of the optical head to apply a magnetic field at a position on the track which is ahead of or behind the light beam spot.

9. The magneto-optical disc apparatus according to claim 8, wherein the magnetic field generator has a plurality of magnetic field generating portions on a surface facing the magneto-optical disc, at least one of the magnetic field generating portions is disposed in a manner to apply a magnetic field to a position in ahead of or behind the light beam spot on the magneto-optical disc.

10. The magneto-optical disc apparatus according to claim 8, wherein the magnetic field generator comprises a first magnetic field generating portion including a permanent magnet and a second magnetic field generating portion including a coiled electromagnet, the first magnetic field generating portion is disposed in a manner so as to apply a magnetic field at a position in ahead of or behind the light beam spot on the magneto-optical disc, and the second magnetic field generating portion is disposed at a position so as to apply a magnetic field at the position of the light beam spot.

11. A magneto-optical disc apparatus, comprising a rotating magneto-optical disc including a magneto-optical recording medium configured by at least two magnetic layers respectively having a magnetic exchange interaction;

an optical head moving in a radial direction relative to the magneto-optical disc and irradiating a light beam spot on a track on the magneto-optical disc; and a magnetic field generator including at least a permanent magnet in floating connection with a surface of the magneto-optical disc due to aerodynamic forces caused by rotation of the magneto-optical disc, so that the magnetic field generator floats in correspondence with the motion of the optical head to apply a magnetic field at a position on the track which is ahead of or behind the light beam spot.

12. The magneto-optical disc apparatus according to claim 11, wherein the magnetic field generator has a plurality of magnetic field generating portions on a surface facing the magneto-optical disc, at least one of the magnetic field generating portions is disposed in a manner to apply a magnetic field to a position in ahead of or behind the light beam spot on the magneto-optical disc.

13. The magneto-optical disc apparatus according to claim 11, wherein the magnetic field generator comprises a first magnetic field generating portion including a permanent magnet and a second magnetic field generating portion including a coiled electromagnet, the first magnetic field generating portion is disposed in a manner so as to apply a magnetic field at a position in ahead of or behind the light beam spot on the magneto-optical disc, and the second magnetic field generating portion is disposed at a position so as to apply a magnetic field at the position of the light beam spot.

14. The magneto-optical disc apparatus according to claim 11, wherein the magnetic field generator has a sliding surface racing the surface or the magneto-optical disc, a tapered portion is formed at the front end of the sliding surface for taking air for floating and grooves are formed on the sliding surface for stabilizing floating of the magnetic field generator.

* * * * *